(12) United States Patent
Chou et al.

(10) Patent No.: US 8,587,207 B2
(45) Date of Patent: Nov. 19, 2013

(54) ELECTRONIC BALLAST

(75) Inventors: Ching-Ho Chou, Taoyuan Hsien (TW); Tsung-Yu Ou, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 91 days.

(21) Appl. No.: 13/450,489

(22) Filed: Apr. 19, 2012

(65) Prior Publication Data

US 2013/0147378 A1    Jun. 13, 2013

(30) Foreign Application Priority Data

Dec. 8, 2011    (TW) .............................. 100145224 A

(51) Int. Cl.
*H05B 37/02*    (2006.01)

(52) U.S. Cl.
USPC ............ 315/206; 315/219; 315/224; 315/307

(58) Field of Classification Search
USPC ........................ 315/206, 224, 219, 291, 307
See application file for complete search history.

(56) References Cited

U.S. PATENT DOCUMENTS

| 2002/0113556 A1* | 8/2002 | Tao et al. ........................ 315/219 |
| 2008/0129216 A1* | 6/2008 | Fang et al. ..................... 315/219 |
| 2010/0194303 A1* | 8/2010 | Komatsu ........................ 315/224 |

* cited by examiner

*Primary Examiner* — Don Le
(74) *Attorney, Agent, or Firm* — CKC & Partners Co., Ltd.

(57) ABSTRACT

An electronic ballast for a light emitting load is provided, and includes a transformer module, a resonance module, a high-frequency push-pull inverter and a driving controller module. The high-frequency push-pull inverter includes a first switch component and a second switch component. The driving controller module is used for generating and providing an asymmetric driving waveform to the first switch component and the second switch component. The asymmetric driving waveform includes a first discharging waveform portion for discharging and turning off the first switch component, and also a second discharging waveform portion for discharging and turning off the second switch component. The first and second discharging waveform portions are different in current amplitudes and time spans.

15 Claims, 8 Drawing Sheets

ELECTRONIC BALLAST

RELATED APPLICATIONS

This application claims priority to Taiwan Patent Application Serial Number 100145224, filed Dec. 8, 2011, which is herein incorporated by reference.

BACKGROUND

1. Field of Invention

The present invention relates to an electronic ballast. More particularly, the present invention relates to an electronic ballast capable of generating an asymmetric driving signal.

2. Description of Related Art

Recently, a gas-discharge fluorescent lamp has become widely used illumination equipment. The fluorescent lamp have better luminous efficiency than a conventional incandescent bulb, because a higher proportion of energy consumed by the fluorescent lamps is converted into visible light and also less heat is generated by the fluorescent lamp. Therefore, the operating temperature of the fluorescent lamp is lower than the operating temperature of the conventional incandescent bulb under the same brightness. The fluorescent lamp with better luminous efficiency is utilized in a variety of illumination applications.

The conventional fluorescent lamp needs to work with an electronic ballast. Reference is made to FIG. 1, FIG. 1 is a schematic diagram illustrating a conventional electronic ballast 100. The electronic ballast 100 includes a direct current power source 180, a rectifier circuit 190, an inverter 160, a transformer 120 and a resonance circuit 140.

However, a striation phenomenon is likely to occur in the fluorescent lamp under low temperature (for example, when the fluorescent lamp is just activated) or low power (for example, when the fluorescent lamp is set to be operated under low brightness). Reference is made to FIG. 2, which is a schematic diagram illustrating a conventional fluorescent lamp 200 with the striation phenomenon. The conventional fluorescent lamp 200 with the to striation phenomenon will flicker between darkness and brightness, thus affecting user visual experience. Furthermore, the striation phenomenon on the fluorescent lamp 200 under low power also limits the adjustable dimming range of the fluorescent lamp 200.

The conventional solutions includes adding a direct current (DC) component into the driving signal of the inverter 160 of the electronic ballast 100, or providing an asymmetric waveform as the driving signal, thereby solving the striation phenomena on the fluorescent lamp 200.

Referring to FIG. 3 for adding a direct current, FIG. 3 is a schematic diagram illustrating a DC component 104 added into a driving signal waveform 102. However, in the driving signal waveform 102 as shown in FIG. 3, the DC component 104 will continuously consumes one single side of the filament material within the fluorescent lamp, such that the lifetime of the fluorescent lamp will be reduced.

In another solution, an asymmetric waveform is provided as the driving signal. Referring to FIG. 4, FIG. 4 is a schematic diagram illustrating a conventional asymmetric waveform 106. The asymmetric waveform 106 can be generated by an asymmetric driving circuit. However, the asymmetric driving circuit may drive one of power switch units (such as a bipolar junction transistor) within the electronic ballast of the fluorescent lamp into an over saturation state. The power switch unit in the over saturation state may increase the switching loss and elevate the operating temperature.

SUMMARY

In order to solve the aforesaid problem, this disclosure provides an electronic ballast for a light emitting load (e.g., gas-discharge fluorescent lamp). The electronic ballast generates an asymmetric driving waveform to two switch units of a high-frequency push-pull inverter. The asymmetric driving waveform of the invention includes two waveform portions for discharging and turning off two switch units. These two discharge waveform portions are different in current amplitudes and time spans, so as to form the asymmetric driving waveform. Two charge waveform portions of the driving waveform corresponding to two switch units are substantially the same. Only the discharge waveform portions are mismatched in the disclosure to realize the difference on discharging and turning off time between two switch units, so as to solve the striation phenomena on the fluorescent lamp.

An aspect of the invention is to provide an electronic ballast suitable for a light emitting load. The electronic ballast includes a transformer module, a resonance module, a high-frequency push-pull inverter and a driving controller module. The resonance module is coupled to the transformer module. The high-frequency push-pull inverter includes a first switch unit and a second switch unit. The driving controller module is coupled with the transformer module and the high-frequency push-pull inverter. The driving controller module is used for generating an asymmetric driving waveform to the first switch unit and the second switch unit. The asymmetric driving waveform includes a first discharge waveform portion for discharging and turning off the first switch unit and a second discharge waveform portion for discharging and turning off the second switch unit. The first discharge waveform portion and the second discharge waveform portion are different in current amplitudes and time spans.

According to an embodiment of the invention, each of the first switch unit and the second switch unit is a current-controlled switch.

According to an embodiment of the invention, each of the first switch unit and the second switch unit is a bipolar junction transistor.

According to an embodiment of the invention, the driving controller module includes a driving winding, a first resistor and a first diode. The driving winding is wound on a magnetic component of the transformer module. Two terminals of the driving winding are coupled to base poles of the first switch unit and the second switch unit. The first resistor and the first diode are connected in parallel to each other and are coupled between the driving winding and the base pole of the second switch unit.

According to an embodiment of the invention, an anode of the first diode is coupled to the base pole of the second switch unit. A cathode of the first diode is coupled to the driving winding. The first diode limits a direction of bypassing current, such that a discharging path of the first switch unit goes through the first resistor and another discharging path of the second switch unit goes through the first diode, so as to generate the asymmetric driving waveform by forming the first discharge waveform portion and the second discharge waveform portion different in current amplitudes and time spans.

According to an embodiment of the invention, the driving controller module further includes a second diode, a second resistor and a third resistor. An anode of the second diode is coupled to one terminal of the first switch unit and one terminal of the second switch unit. The second resistor is coupled between a cathode of the second diode and the base pole of the first switch unit. The third resistor is coupled between the cathode of the second diode and the base pole of the second switch unit.

According to an embodiment of the invention, a charging path of the first switch unit goes through the second diode, the third resistor and the first diode. A charging path of the second switch unit goes through the first resistor, the second diode and the second resistor.

According to an embodiment of the invention, resistances of the second resistor and the third resistor are similar and are apparently greater than a resistance of the first resistor.

According to an embodiment of the invention, the driving controller module includes a first driving winding and a second driving winding. The first driving winding and the second driving winding are wound on a magnetic component of the transformer module. The first driving winding is used to generate the first discharge waveform portion of the asymmetric driving waveform for the first switch unit. The second driving winding is used to generate the second discharge waveform portion of the asymmetric driving waveform for the second switch unit.

According to an embodiment of the invention, the driving controller module further includes a first resistor, a first diode and a second resistor for the first switch unit. The second resistor and the first diode are connected in parallel to each other and are connected in series to the first resistor. The second resistor, the first diode and the first resistor are coupled between the first driving winding and a base pole of the first switch unit. The driving controller module further includes a third resistor and a second diode for the second switch unit. The third resistor and the second diode are connected in parallel to each other and are coupled between the second driving winding and a base pole of the second switch unit.

According to an embodiment of the invention, a discharging path of the first switch unit goes through the first diode and the first resistor. Another discharging path of the second switch unit goes through the second diode, so as to generate the asymmetric driving waveform by forming the first discharge waveform portion and the second discharge waveform portion different in current amplitudes and time spans.

According to an embodiment of the invention, a charging path of the first switch unit goes through the first resistor and the second resistor. A charging path of the second switch unit goes through the third resistor.

According to an embodiment of the invention, resistances of the second resistor and the third resistor are similar and are apparently greater than a resistance of the first resistor.

According to an embodiment of the invention, the electronic ballast further includes a direct current power source and a rectifier circuit. The rectifier circuit is coupled between the direct current power source and the high-frequency push-pull inverter.

According to an embodiment of the invention, the electronic ballast further includes an adjustment capacitor unit. The adjustment capacitor unit is coupled between a secondary side of the transformer module and the light emitting load.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
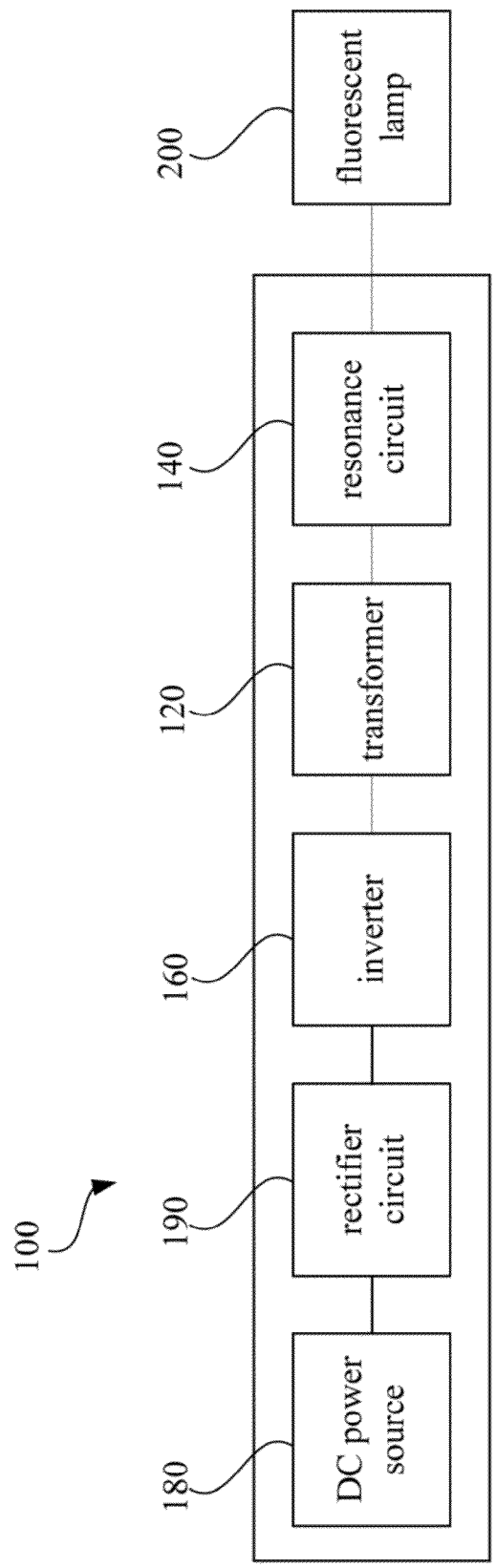
FIG. 1 is a schematic diagram illustrating a traditional electronic ballast.
Figure 2:
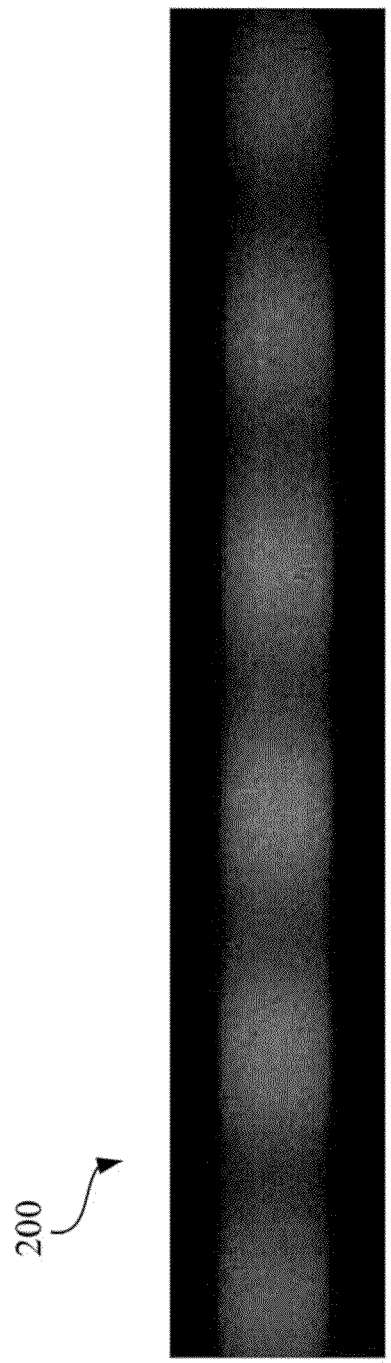
FIG. 2 is a schematic diagram illustrating a traditional fluorescent lamp with striation phenomena.
Figure 3:
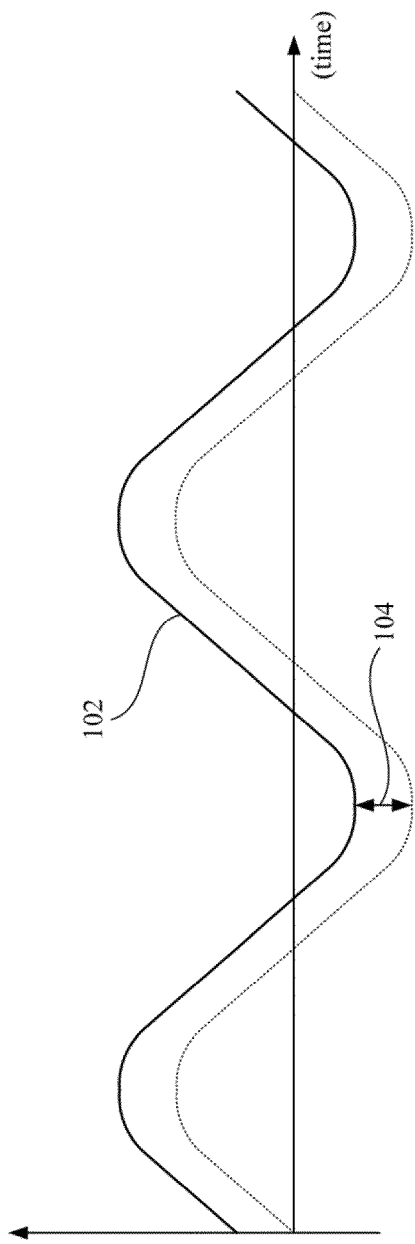
FIG. 3 is a schematic diagram illustrating a DC component added into a driving signal waveform.
Figure 4:
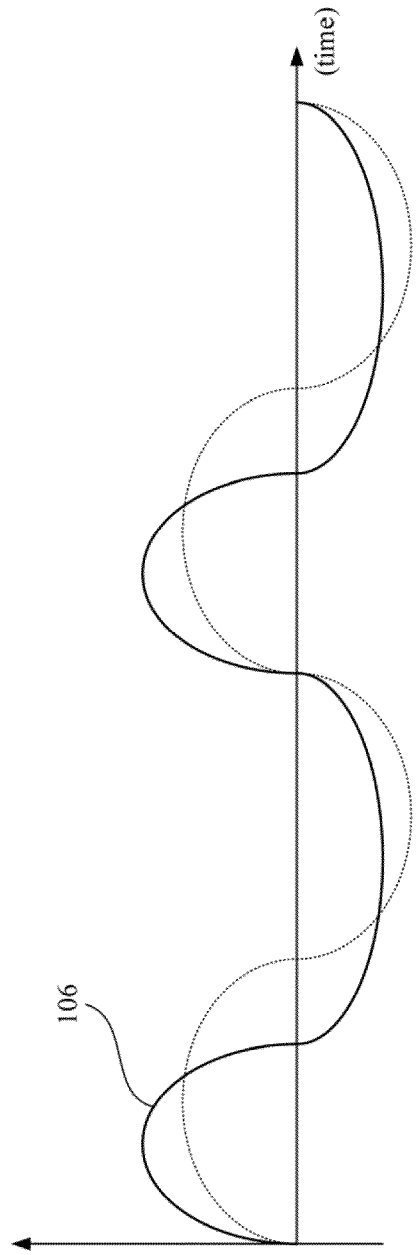
FIG. 4 is a schematic diagram illustrating a traditional asymmetric waveform.
Figure 5:
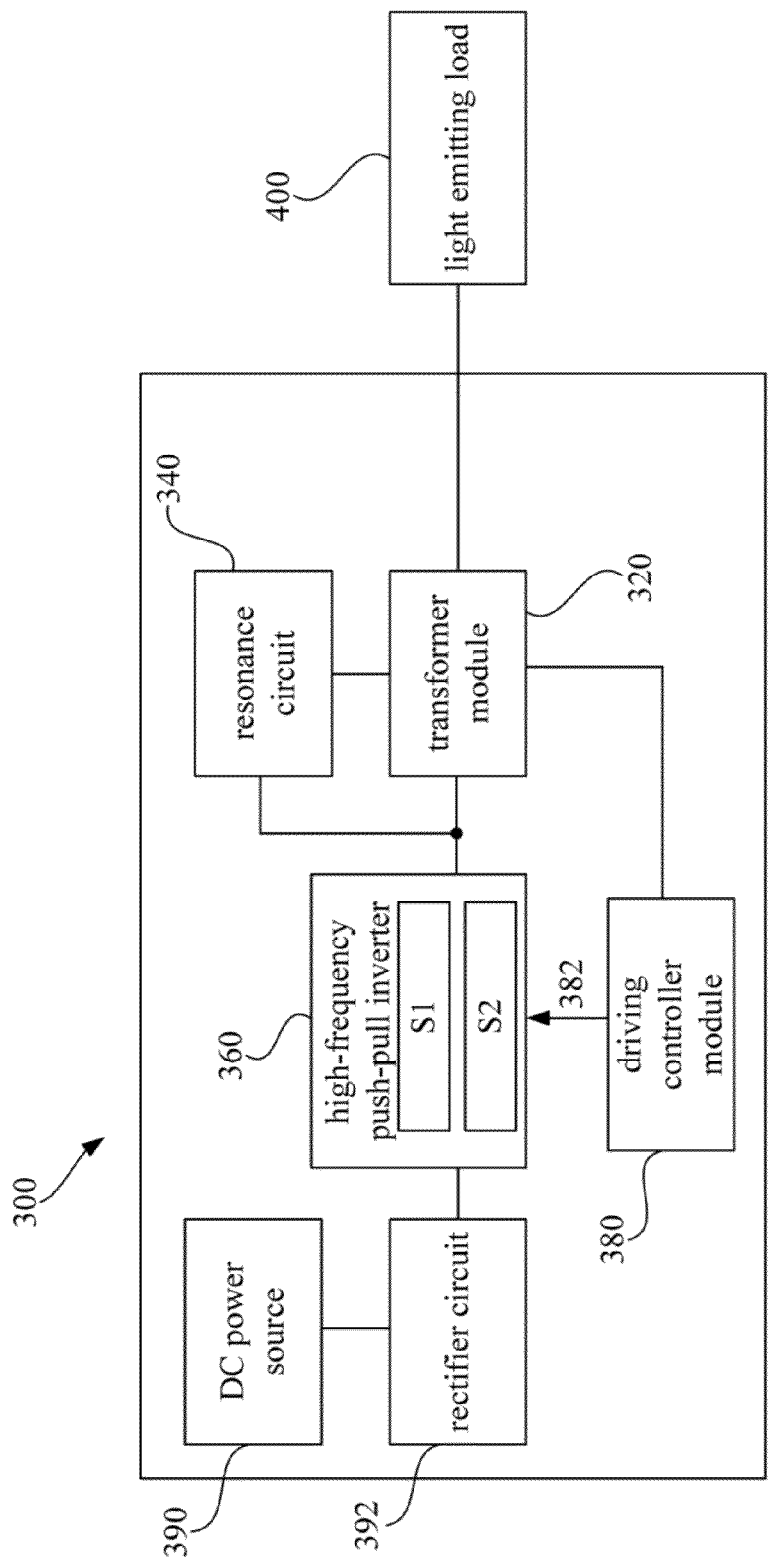
FIG. 5 is a functional block diagram illustrating an electronic ballast according to an embodiment of the invention.

Reference is made to FIG. 5, which is a functional block diagram illustrating an electronic ballast 300 according to an embodiment of the invention. As shown in FIG. 5, the electronic ballast 300 includes a transformer module 320, a resonance circuit 340, a high-frequency push-pull inverter 360 and a driving controller module 380. In practical applications, the electronic ballast 300 may further include a direct current (DC) power source 390 and a rectifier circuit 392.

As shown in FIG. 5, the rectifier circuit 392 is coupled between the direct current power source 390 and the high-frequency push-pull inverter 360. The rectifier circuit 392 is used for rectifying the input signal from the direct current power source 390 and transmitting the rectified input signal to the high-frequency push-pull inverter 360. The high-frequency push-pull inverter 360 is coupled to the primary side of the transformer module 320. The high-frequency push-pull inverter 360 is used for transforming the rectified input signal into a switching alternating current (AC) signal, which is transmitted to the transformer module 320.

The resonance circuit 340 is coupled with the transformer module 320. In the embodiment, the resonance circuit 340 is connected in parallel to the primary side of the transformer module 320. The resonance circuit 340 can be used for transforming the switching alternating current signal into a sinusoidal AC signal. Afterward, the sinusoidal AC signal is used for driving the light emitting load 400 through the transformer module 320. In the embodiment, the light emitting load 400 can be a fluorescent lamp, such as a gas-discharge fluorescent lamp, but the invention is not limited thereto.

In the embodiment, the high-frequency push-pull inverter 360 includes a first switch unit S1 and a second switch unit S2. The driving controller module 380 is coupled with the transformer module 320 and the high-frequency push-pull inverter 360. The driving controller module 380 is used for generating and providing an asymmetric driving waveform 382 to the first switch unit S1 and the second switch unit S2 of the high-frequency push-pull inverter 360.

Figure 6:
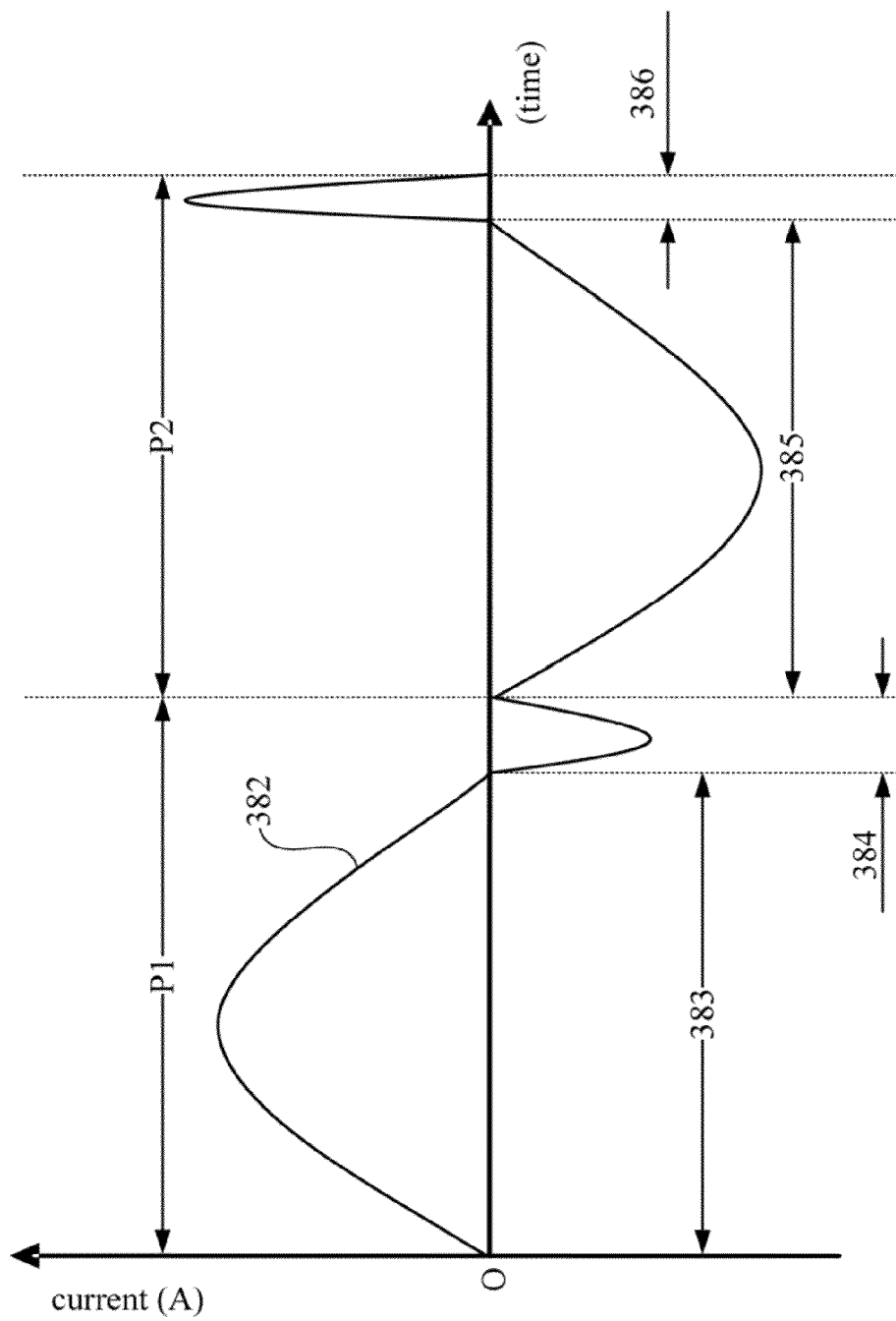
FIG. 6 is a diagram illustrating an asymmetric driving waveform according to an embodiment of the invention.

Reference is also made to FIG. 6, which is a waveform diagram illustrating the asymmetric driving waveform 382 according to an embodiment of the invention. As shown in FIG. 6, the asymmetric driving waveform 382 generated by the driving controller module 380 is a current-type driving waveform with its current amplitude changed with time. The current-type driving waveform can be used to control the current-controlled switches, i.e., the first switch unit S1 and the second switch unit S2.

In the embodiment, each of the first switch unit S1 and the second switch unit S2 is a current-controlled switch. For example, each of the first switch unit S1 and the second switch unit S2 can be a bipolar junction transistor (BJT) in practical applications. The bipolar junction transistor utilizes a current signal for switching. When the bipolar junction transistor is switched from an on-state to an off-state, the charges accumulated on the base pole and the output terminal of the bipolar junction transistor have to be discharged. In other words, reversed currents has to be induced to the base poles of the first switch unit S1 and the second switch unit S2, so as to turn off the first switch unit S1 and the second switch unit S2.

As shown in FIG. 6, the asymmetric driving waveform 382 includes a phase P1 for controlling the first switch unit S1 and a phase P2 for controlling the first switch unit S2.

The phase P1 of the asymmetric driving waveform 382 includes a first charge waveform portion 383 for charging and turning on the first switch unit S1 and a first discharge waveform portion 384 for discharging and turning off the first switch unit S1.

The phase P2 of the asymmetric driving waveform 382 includes a second charge waveform portion 385 for charging and turning on the second switch unit S2 and a second discharge waveform portion 386 for discharging and turning off the second switch unit S2.

It should be noted that, the first discharge waveform portion 384 and the second discharge waveform portion 386 are different in current amplitudes and time spans, so as to achieve the asymmetric driving waveform 382 generated by the driving controller module 380. In the mean time, the charge waveform portions (i.e., the first charge waveform portion 383 and the second charge waveform portion 385) within the asymmetric driving waveform 382 are substantially the same (except that two charge waveform portions are in opposite directions), but the invention is not limited to the same charge waveform portions. The invention utilizes the difference between the first discharge waveform portion 384 and the second discharge waveform portion 386 to differentiate the discharging times of the two switch units, so as to overcome the striation phenomena on the light emitting load 400 (fluorescent lamp).

The first switch unit S1 and the second switch unit S2 within the high-frequency push-pull inverter 360 are turned on alternatively to form the switching AC signal. The first charge waveform portion 383 and the second charge waveform portion 385 occupy a large share of time over one cycle of the driving waveform. In a conventional design, two charge waveform portions are mismatched to form asymmetry. However, the conventional design may drive one of switch units (the first switch unit S1 or the second switch unit S2) into an over saturation state. The switch unit in the over saturation state may increase the switching loss and elevate the operating temperature.

As shown in FIG. 6, the first discharge waveform portion 384 and the second discharge waveform portion 386 occupy a small share of time over one cycle of the driving waveform. In the embodiment, two discharge waveform portions (the first discharge waveform portion 384 and the second discharge waveform portion 386) are mismatched to differentiate the discharging times of the two switch units. In this case, the overall variation to the driving signal is less than the conventional design. Besides, the asymmetric driving waveform 382 in the embodiment may not be affected by the operational temperature easily. There are at least two circuit embodiments disclosed in the following paragraphs to form the aforementioned asymmetric driving waveform 382.

Figure 7:
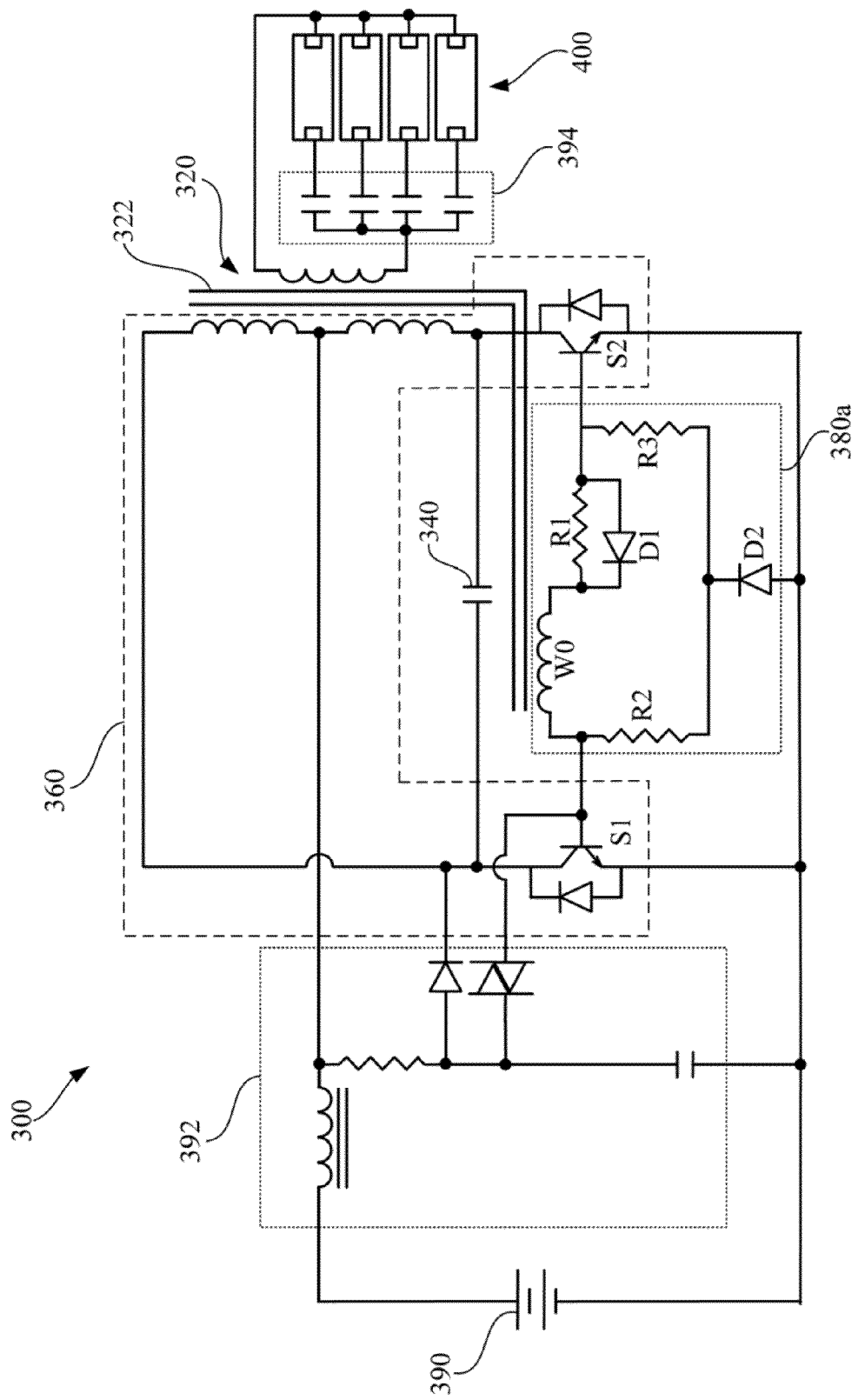
FIG. 7 is a schematic diagram illustrating a driving controller module of the electronic ballast shown in FIG. 5 adopting a singular winding design in an embodiment.

Reference is also made to FIG. 7, which is a schematic diagram illustrating the driving controller module 380 of the electronic ballast 300 shown in FIG. 5 adopting a singular winding design in an embodiment. As shown in FIG. 7, the driving controller module 380a is in a design of singular winding with dual driving directions. The driving controller module 380a includes a driving winding W0, a first resistor R1 and a first diode D1. The driving winding W0 is wound on a magnetic component 322 of the transformer module 320. Two terminals of the driving winding W0 are coupled to base poles of the first switch unit S1 and the second switch unit S2. The first resistor R1 and the first diode D1 are connected in parallel to each other and are coupled between the driving winding W0 and the base pole of the second switch unit S2.

As shown in FIG. 7, the driving controller module 380a further includes a second diode D2, a second resistor R2 and a third resistor R3. An anode of the second diode D2 is coupled to one terminal of the first switch unit S1 and one terminal of the second switch unit S2. The second resistor R2 is coupled between a cathode of the second diode D2 and the base pole of the first switch unit S1. The third resistor R3 is coupled between the cathode of the second diode D2 and the base pole of the second switch unit S2.

In the embodiment, resistances of the second resistor R2 and the third resistor R3 can be similar and are apparently greater than a resistance of the first resistor R1. For example, the resistance of the second resistor R2 and that of the third resistor R3 can be 22 ohms ($\Omega$) respectively, and the resistance of the first resistor R1 can be 1 ohm ($\Omega$).

In the embodiment, the resonance circuit 340 can be a capacitor unit connected in parallel to the primary side of the transformer module 320 (as shown in FIG. 7). Furthermore, the electronic ballast 300 may further includes an adjustment capacitor unit 394. The adjustment capacitor unit 394 is coupled between a secondary side of the transformer module 320 and the light emitting load 400. The adjustment capacitor unit 394 is mainly served as a ballast capacitor for adjusting the output current. The adjustment capacitor unit 394 also participates in the job of the resonance circuit 340 under a steady state.

Figure 8C:
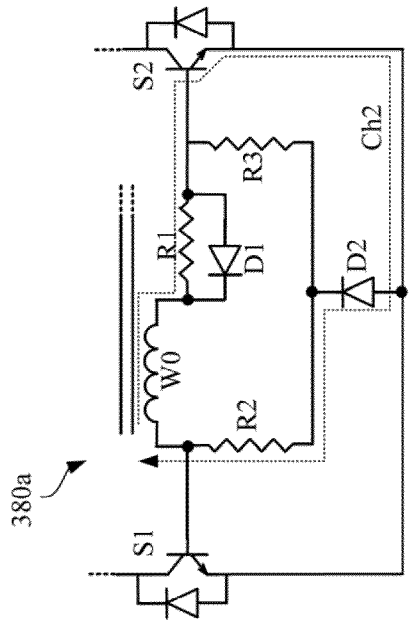
FIG. 8A to FIG. 8D are schematic diagrams illustrating the charging/discharging paths of a first switch unit and a second switch unit of the driving controller module shown in FIG. 7.
Figure 8D:
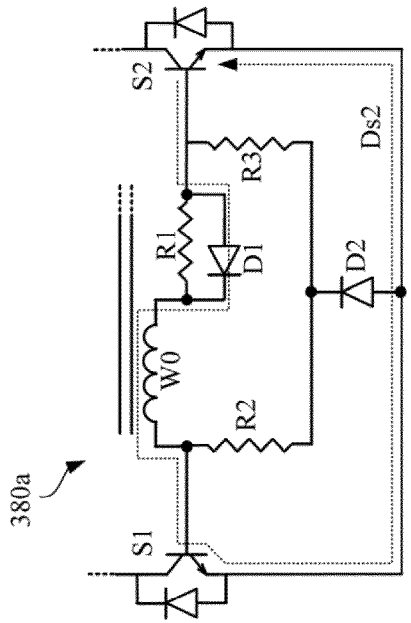
Figure 8A:
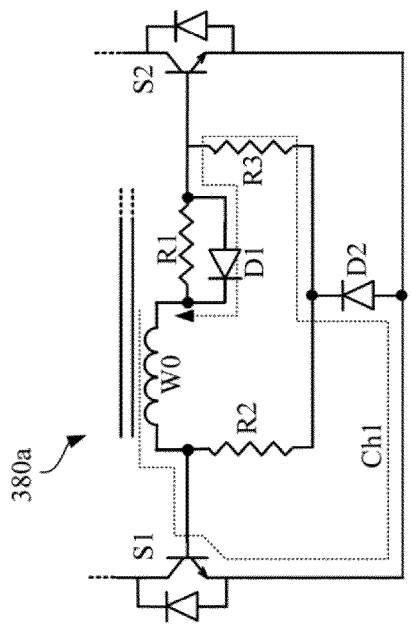
Figure 8B:
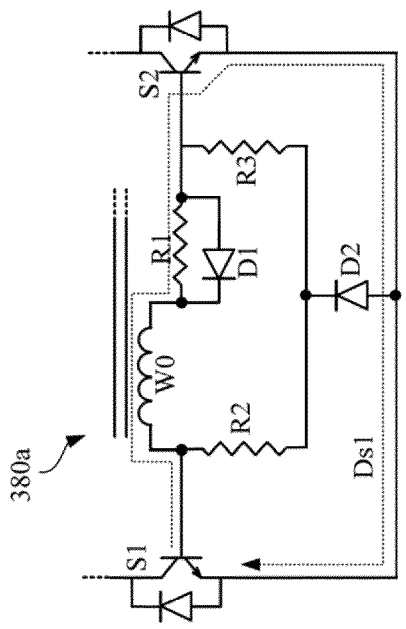

Reference is also made to FIG. 8A to FIG. 8D. FIG. 8A to FIG. 8D are schematic diagrams illustrating the charging/discharging paths of the first switch unit S1 and the second switch unit S2 of the driving controller module 380a shown in FIG. 7. FIG. 8A shows the charging path Ch1 of the first switch unit S1. FIG. 8B shows the discharging path Ds1 of the first switch unit S1. FIG. 8C shows the charging path Ch2 of the second switch unit S2. FIG. 8D shows the discharging path Ds2 of the second switch unit S2.

As shown in FIG. 8B and FIG. 8D, an anode of the first diode D1 is coupled to the base pole of the second switch unit S2. A cathode of the first diode D1 is coupled to the driving winding W0. The first diode D1 limits a direction of bypassing current, such that a discharging path Ds1 of the first switch unit passes through the first resistor R1 and another discharging path Ds2 of the second switch unit S2 passes through the first diode D1.

Under an ideal situation, the first diode D1 can be regarded as no resistance. The resistance value on the discharging path Ds1 of the first switch unit S1 is about 1 ohm. The resistance value on the discharging path Ds2 of the second switch unit S2 is about 0 ohm. Therefore, the resistance ratio between the discharging paths Ds1 and Ds2 is close to infinite. (In practical applications, the trivial resistance difference on the driving winding W0, the first switch unit S1 and the second switch unit S2 still needs to be considered.)

Through the resistance difference between the discharging paths Ds1 and Ds2, the first discharge waveform portion 384 is different from the second discharge waveform portion 386 in current amplitudes and time spans. Referring to FIG. 6, the resistance on the discharging path Ds1 is higher, such that the current amplitude is lower and the time interval is longer during the first discharging waveform portion 384. The resistance on the discharging path Ds2 is lower, such that the current amplitude is higher and the time interval is shorter during the second discharging waveform portion 386. Therefore, the asymmetric driving waveform 382 is formed.

On the other hand, as shown in FIG. 8A and FIG. 8C, a charging path Ch1 of the first switch unit S1 passes through the second diode D2, the third resistor R3 and the first diode D1. A charging path Ch2 of the second switch unit S2 passes through the first resistor R1, the second diode D2 and the second resistor R2.

Under an ideal situation, the first diode D1 and the second diode D2 can be regarded as zero resistance. Therefore, the resistance value on the charging path Ch1 of the first switch unit S1 is 22 ohms. The resistance value on the charging path Ch2 of the second switch unit S2 is 23 ohms. The resistance ratio between the charging paths Ch1 and Ch2 is relatively small. In other words, the resistances on the charging patterns Ch1 and Ch2 can be regarded as equal to each other. Therefore, the charging time of the first switch unit S1 and that of the second switch unit S2 are approximately the same, but the invention is not limited thereto.

The driving waveform generated by the circuit structure in FIG. 7 for driving two switch units includes charging waveform portions and discharging waveform portions. The charging waveform portions corresponding to two switch units are substantially the same, and only the difference between the discharging waveform portions is mainly adopted to differentiate the discharging times on the two switch units, so as to overcome the striation phenomenon on the fluorescent lamp.

However, the circuit structure of the driving controller module 380 in the electronic ballast 300 is not limited to the driving controller module 380a shown in FIG. 7.

Figure 9:
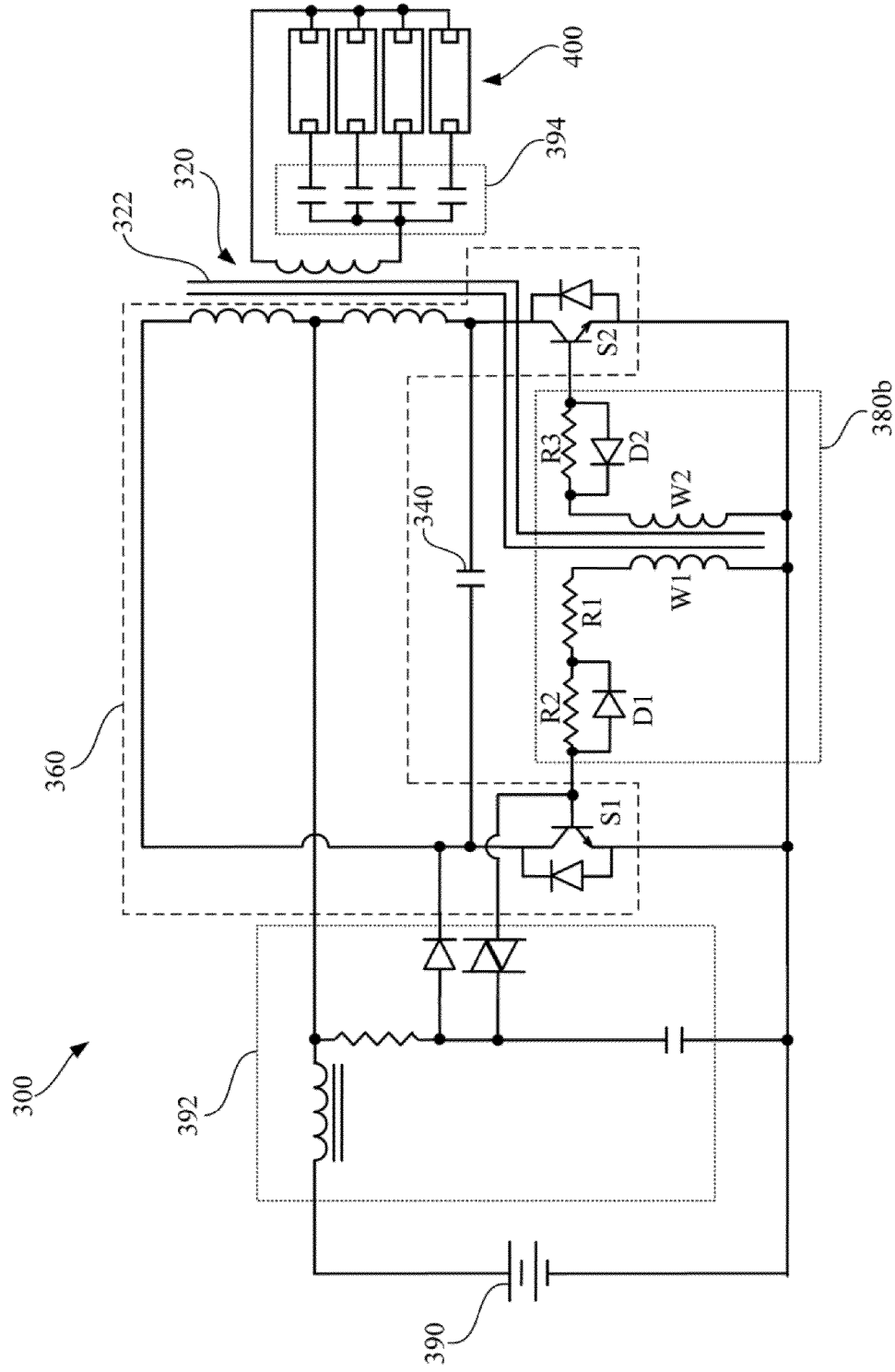
FIG. 9 is a schematic diagram illustrating the driving controller module of the electronic ballast shown in FIG. 5 adopting a dual windings design in another embodiment.

Reference is also made to FIG. 9, which is a schematic diagram illustrating the driving controller module 380 of the electronic ballast 300 shown in FIG. 5 adopting a dual winding design in another embodiment. As shown in FIG. 9, the driving controller module 380b is in a design of dual windings with a singular driving direction.

As shown in FIG. 9, the driving controller module 380b includes a first driving winding W1 and a second driving winding W2. The first driving winding W1 and the second driving winding W2 are wound on a magnetic component 322 of the transformer module 320.

The first driving winding W1 is used to generate the first discharge waveform portion 384 (as shown in FIG. 6) of the asymmetric driving waveform 382 for the first switch unit S1. The second driving winding W2 is used to generate the second discharge waveform portion 386 (as shown in FIG. 6) of the asymmetric driving waveform 382 for the second switch unit S2.

As shown in FIG. 9, the driving controller module 380b further includes a first resistor R1, a first diode D1 and a second resistor R2 for the first switch unit S1. The second resistor R2 and the first diode D1 are connected in parallel to each other and are connected in series to the first resistor R1. The second resistor R2, the first diode D1 and the first resistor R1 are coupled between the first driving winding W1 and a base pole of the first switch unit S1. The driving controller module 380b further includes a third resistor R3 and a second diode D2 for the second switch unit S2. The third resistor R3 and the second diode D2 are connected in parallel to each other and are coupled between the second driving winding W2 and a base pole of the second switch unit S2.

In this embodiment, resistances of the second resistor R2 and the third resistor R3 are similar and are apparently greater than a resistance of the first resistor R1. For example, the resistance of the second resistor R2 and the third resistor R3 can be 22 ohms ($\Omega$) respectively, and the resistance of the first resistor R1 can be 1 ohm ($\Omega$).

Under an ideal situation, the first diode D1 and the second diode D2 can be regarded as no resistance. Referring to FIG. 9, a discharging path of the first switch unit S1 passes through the first diode D1 and the first resistor R1, and the total resistance value is 1 ohm. Another discharging path of the second switch unit S2 passes through the second diode D2, and the total resistance value is about 0 ohm. In this way, the asymmetric driving waveform 382 (as shown in FIG. 6) is generated by forming the first discharge waveform portion 384 and the second discharge waveform portion 386 which are different in current amplitudes and time spans. The detail description about the asymmetric driving waveform 382 can be referred the paragraphs in aforesaid embodiments, and thus is not to be repeated again herein.

On the other hand, a charging path of the first switch unit S1 of the driving controller module 380b passes through the first resistor R1 and the second resistor R2, and the total resistive value is about 23 ohms. A charging path of the second switch unit S2 of the driving controller module 380b passes through the third resistor R3, and the total resistive value is about 22 ohm. The resistance difference between two charging paths is relatively small. In other words, the resistances on two charging paths can be regarded as the same, but the invention is not limited thereto.

In summary, this disclosure provides an electronic ballast for a light emitting load. The electronic ballast generates and provides an asymmetric driving waveform to two switch units of a high-frequency push-pull inverter. The asymmetric driving waveform of the invention includes two waveform portions for discharging and turning off two switch units. These two discharge waveform portions are different in current amplitudes and time spans, so as to form the asymmetric driving waveform. Two charge waveform portions of the driving waveform corresponding to two switch units are substantially the same, and only the discharge waveform portions are mismatched in the disclosure, thereby making the discharging and turning off time between two switch units different for solving the striation phenomena on the fluorescent lamp.

It will be apparent to those skilled in the at that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic ballast suitable for a light emitting load, the electronic ballast comprising:
   a transformer module;
   a resonance module coupled to the transformer module;
   a high-frequency push-pull inverter comprising a first switch unit and a second switch unit; and
   a driving controller module coupled with the transformer module and the high-frequency push-pull inverter for generating and providing an asymmetric driving waveform to the first switch unit and the second switch unit, the asymmetric driving waveform comprising a first discharge waveform portion for discharging and turning off the first switch unit and a second discharge waveform portion for discharging and turning off the second switch unit, wherein the first discharge waveform portion and the second discharge waveform portion are different in current amplitudes and time spans.

2. The electronic ballast of claim 1, wherein each of the first switch unit and the second switch unit is a current-controlled switch.

3. The electronic ballast of claim 2, wherein each of the first switch unit and the second switch unit is a bipolar junction transistor.

4. The electronic ballast of claim 2, wherein the driving controller module comprises a driving winding, a first resistor and a first diode, and the driving winding is wound on a magnetic component of the transformer module, and two terminals of the driving winding are coupled to a base pole of the first switch unit and a base pole of the second switch unit, and the first resistor and the first diode are connected in parallel to each other and are coupled between the driving winding and the base pole of the second switch unit.

5. The electronic ballast of claim 4, wherein an anode of the first diode is coupled to the base pole of the second switch unit, and a cathode of the first diode is coupled to the driving winding, and by using the first diode to restrict a direction of bypassing current, a discharging path of the first switch unit passes through the first resistor, and another discharging path of the second switch unit passes through the first diode, so as to generate the asymmetric driving waveform by forming the first discharge waveform portion and the second discharge waveform portion different in current amplitudes and time spans.

6. The electronic ballast of claim 5, wherein the driving controller module further comprises a second diode, a second resistor and a third resistor, wherein an anode of the second diode is coupled to one terminal of the first switch unit and one terminal of the second switch unit, and the second resistor is coupled between a cathode of the second diode and the base pole of the first switch unit, and the third resistor is coupled between the cathode of the second diode and the base pole of the second switch unit.

7. The electronic ballast of claim 6, wherein a charging path of the first switch unit passes through the second diode, the third resistor and the first diode, and a charging path of the second switch unit passes through the first resistor, the second diode and the second resistor.

8. The electronic ballast of claim 6, wherein resistances of the second resistor and the third resistor is similar and are apparently greater than a resistance of the first resistor.

9. The electronic ballast of claim 1, wherein the driving controller module comprises a first driving winding and a second driving winding, wherein the first driving winding and the second driving winding are wound on a magnetic component of the transformer module, and the first driving winding is used to generate the first discharge waveform portion of the asymmetric driving waveform for the first switch unit, and the second driving winding is used to generate the second discharge waveform portion of the asymmetric driving waveform for the second switch unit.

10. The electronic ballast of claim 9, wherein the driving controller module further comprises a first resistor, a first diode and a second resistor for the first switch unit, and the second resistor and the first diode are connected in parallel to each other and are connected in series to the first resistor, and the second resistor, the first diode and the first resistor are coupled between the first driving winding and a base pole of the first switch unit, and the driving controller module further comprises a third resistor and a second diode for the second switch unit, and the third resistor and the second diode are connected in parallel to each other and are coupled between the second driving winding and a base pole of the second switch unit.

11. The electronic ballast of claim 10, wherein a discharging path of the first switch unit passes through the first diode and the first resistor, another discharging path of the second switch unit passes through the second diode, so as to generate the asymmetric driving waveform by forming the first discharge waveform portion and the second discharge waveform portion which are different in current amplitudes and time spans.

12. The electronic ballast of claim 10, wherein a charging path of the first switch unit passes through the first resistor and the second resistor, and a charging path of the second switch unit passes through the third resistor.

13. The electronic ballast of claim 10, wherein resistances of the second resistor and the third resistor are similar and apparently greater than a resistance of the first resistor.

14. The electronic ballast of claim 1, further comprising a direct current power source and a rectifier circuit, wherein the rectifier circuit is coupled between the direct current power source and the high-frequency push-pull inverter.

15. The electronic ballast of claim 1, further comprising an adjustment capacitor unit coupled between a secondary side of the transformer module and the light emitting load.

* * * * *